May 21, 1935.  S. BOTTEESE  2,001,929
CONVERTIBLE CHILD'S VEHICLE
Filed Feb. 12, 1934   2 Sheets-Sheet 1

Inventor
S. Botteese
By C. F. Haden
Attorney

May 21, 1935.  S. BOTTEESE  2,001,929
CONVERTIBLE CHILD'S VEHICLE
Filed Feb. 12, 1934   2 Sheets-Sheet 2
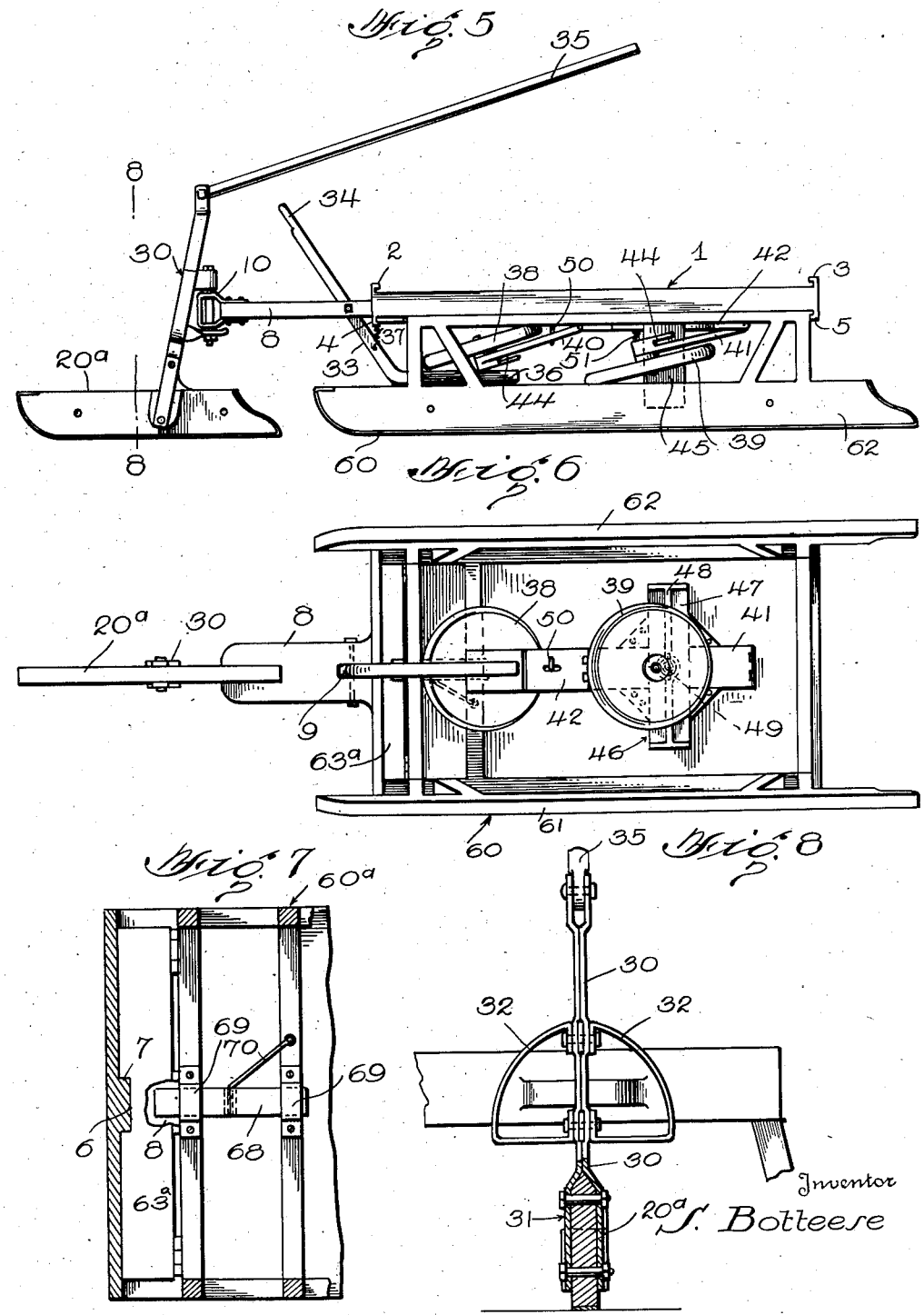

Patented May 21, 1935

2,001,929

UNITED STATES PATENT OFFICE 2,001,929

CONVERTIBLE CHILD'S VEHICLE

Shearman Botteese, Washington, D. C.

Application February 12, 1934, Serial No. 710,927

11 Claims. (Cl. 280—8)

This invention relates to children's vehicles of the convertible type.

A primary object of the invention is to provide a vehicle which may be readily converted from a wagon to a sled and vice versa and when in the form of a sled may be quickly changed to a coaster for use when there is no snow.

Another object of the invention is to construct such a vehicle having a body carrying both wheels and runners which may be interchangeably used without requiring any change in the main or body structure and in which the runner member may be used either to form a sled or to form a wagon rack body when the wheels are brought into use.

Another object is to so construct such a vehicle that the runner member may be applied to one face of the main body to form a sled and to the other face to form a wagon rack.

Another object is to construct a toy vehicle of this type in which the major portion of the various parts are carried permanently by the main body structure to prevent loss, the runner member being detachable to vary its use as a sled and as a wagon rack or body and which when in use as either is securely locked in position on the main body structure.

Another object is to provide simple means for detachably mounting coaster wheels or castors on the runners so that the runner member may be quickly converted into a coaster or into a sled.

Still another object is to so mount wheels on the main body that they may be folded and held securely out of the way when the vehicle is used as a sled or coaster, and which may be quickly lowered and secured for use as supporting wheels when a wagon is desired.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

In the accompanying drawings:

Fig. 5 is a side elevation of the vehicle arranged for use as a sled;

Fig. 6 is a bottom plan view thereof;

Fig. 7 is a detail sectional view showing another means for locking the runner member to the main frame; and Fig. 8 is a detail transverse section taken on the line 8—8 of Fig. 5.

Figure 1:
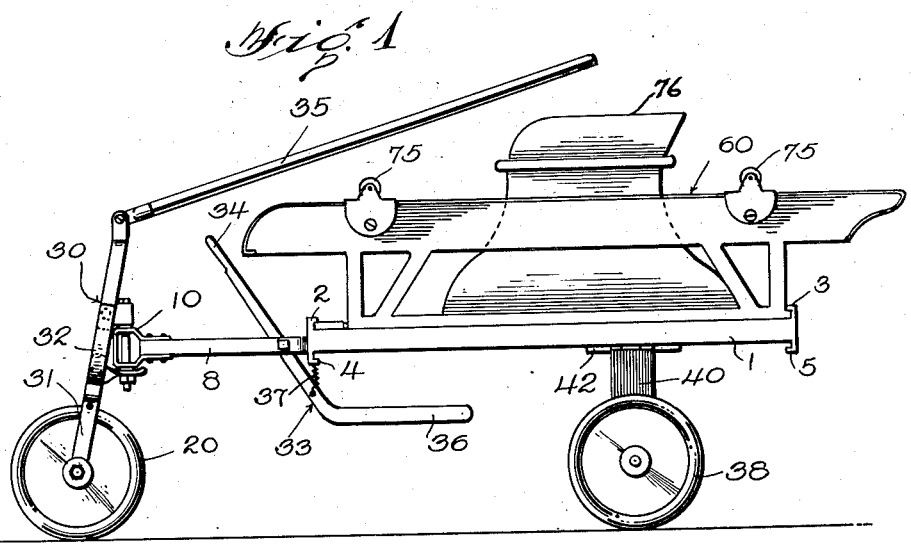
Figure 1 represents a side elevation of the vehicle with the parts arranged for use as a wagon.
Figure 2:
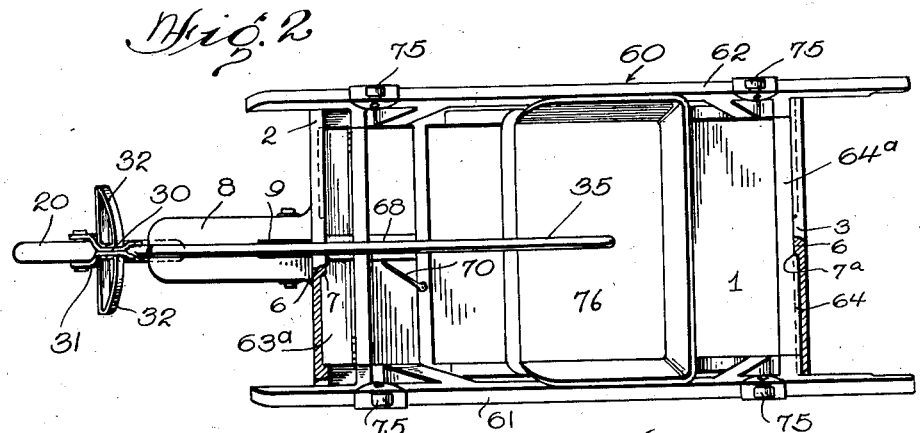
Fig. 2 is a top plan view thereof with parts broken out.
Figure 3:
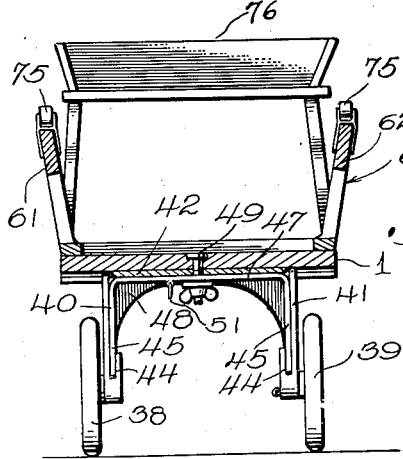
Fig. 3 is a transverse section.

In the embodiment illustrated the vehicle constituting this invention is shown in Figs. 1 to 3 in the form of a child's wagon and in Figs. 5 to 8 as a sled.

The main frame or body of the vehicle comprises a platform 1 here shown rectangular and composed of any suitable material of requisite thickness to support the weight which it is designed to carry.

This platform is provided at its opposite ends on both faces with transversely extending guides or housings formed by overhanging lips facing inwardly. The lips 2 and 3 on one face are arranged opposite and face each other while those 4 and 5 on the other face are similarly arranged. These housings are designed to cooperate with complementary members on the runner member to be described for securing said member to the main body.

Rigidly carried by and projecting from the front end of the platform 1 is an extension or reach bar 8 having a brake-receiving slot 9 intermediate its ends and a clevis 10 at its front end to interchangeably receive and support a steering wheel 20 or runner 20ª. These steering elements are adapted to be mounted at will on a steering post 30 which carries at its lower end a fork 31 the arms of which converge at their upper ends and are rigidly secured together by bolting or otherwise. This post 30 is suitably swivelled on the clevis 10 and has a rod 35 pivoted to its upper end designed to be used either for steering by the occupant of the vehicle or as a draft tongue for pulling the vehicle.

Suitable stirrups or foot rests 32 are carried by the post 30 so that the vehicle may be guided either by the feet of the rider or by hand using the rod 35.

A brake 33 here shown obtuse-angled or elbow-shaped is pivotally mounted in the slot 9 of the reach bar 8 with its handle 34 suitably positioned to be grasped by the rider when braking of the vehicle is desired. The ground engaging arm 36 may be equipped with any suitable gripping means and this arm is normally held in raised inoperative position by a spring 37 attached to the brake and to the reach bar and against the tension of which force is exerted when the brake is to be brought into action.

When the vehicle is to be used as a wagon as shown in Figs. 1, 2 and 3 a pair of folding wheels 38 and 39 carried by the lower face of the platform 1 are opened and swung into position and used in connection with the wheel 20 to support the frame and adapt it for use as a wagon.

These wheels 38 and 39 are mounted on stub axles carried by folding arms 40 and 41 pivoted or hinged to a horizontally swingable bar 42 and which arms have pockets 44 to receive locking fingers 45 of a rigid U-shaped member 46 the cross bar 47 of which is rotatable on the lower face of platform 1 and is preferably reinforced as shown at 48 to resist collapsing strain of the wheels when engaged therewith.

The bar or plate 42 which carries the wheels 38 and 39 is bolted or otherwise swivelled to the lower face of the platform 1 to adapt it to swing so as to position the wheels either longitudinally of the platform to permit them to be folded out of the way as shown in Figs. 5 and 6 or transversely as shown in Figs. 1 and 3 to support the vehicle for use as a wagon.

Suitable means are provided for locking the wheels in folded position. The means shown comprise elements 50 and 51 (see Figs. 5 and 6) altho obviously any other suitable means may be employed.

An auxiliary runner member 60 as shown comprises a skeleton platform 65 preferably of a size to fit on the main body platform 1. The runners 61 and 62 are preferably flared as best seen in Fig. 3 which adapts them to form suitable sides for a rack body when the vehicle is used as a wagon as shown in Figs. 1 to 3.

Figure 4:
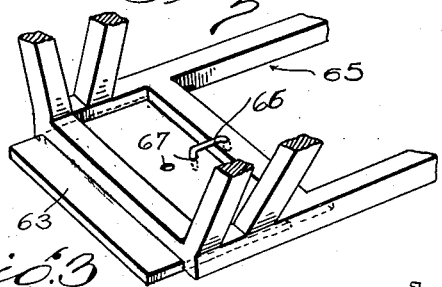
Fig. 4 is a detail perspective view of the runner frame showing the preferred means for locking the main member thereto.

In the form shown in Fig. 4 one end of the runner member body 65 carries a slide 63 extending transversely of the platform and designed to interlockingly engage the housing at one end of the main body on either face, while a fixed lip 64 at the other end of the platform 65 enters and interlocks with the housing at the other end of the main body.

A yielding latch 66 carried by the platform 65 is designed to yieldably engage an aperture 67 in the slide 63 to securely lock said slide and the member on which it is mounted to the main vehicle body 1.

When attaching the runner member to the main frame 1, the fixed lip 64 is slid into the housing at one end of the frame 1 and then the sliding lip 63 is moved forwardly into the housing at the other end of the frame and securely locked by engagement of latch 66 with one of the holes 67.

Rollers or casters 75 may be detachably mounted on the runners 60 as shown in Figs. 1 to 3 to adapt the vehicle to be quickly converted into a coaster or into a sled. A seat 76 may also be removably mounted on the vehicle when the device is used as a wagon.

In the form shown in Figs. 5 to 7 the front and rear cross bars of the member 1 which carry the housings formed by the overhanging lips have projections 6 to enter recesses 7 and 7ª in the hinged lip 63ª and the fixed lip 64ª and hold the member 60 against sliding sidewise. To prevent the hinged lip 63ª from bulging and becoming disconnected from the main body housing, a slide or bolt 68 mounted in suitable keepers 69 is designed to enter a recess 8 in lip 63ª (see Fig. 7). A pin 70 carried by the frame 65 is designed to interlockingly engage bolt 68 and hold it in operative projected position.

I claim as my invention:

1. A convertible child's vehicle comprising a main body member, having rotatable surface-engaging elements on one face, locking elements on both faces of said body member, and an auxiliary member having gliding surface-engaging elements and locking elements for cooperative engagement with the locking elements on either of the faces of the body member whereby the auxiliary member may be connected at will to either face of the body member to form gliding supports or a rack body.

2. A convertible child's vehicle comprising a main body member and an auxiliary member having surface-engaging means, said members having detachable interengageable elements, the main member having elements on both faces to provide for locking engagement of the auxiliary member with either face of the main member to adapt said auxiliary member for use either as a support or as a rack body.

3. A convertible child's vehicle comprising a platform constituting a main body and having overhanging inwardly facing lips on both faces at both ends, and an auxiliary member having surface-engaging elements and means for engaging said lips to lock said auxiliary member to either face of the body.

4. A convertible child's vehicle comprising a platform constituting a main body and having overhanging inwardly facing lips on both faces at both ends, and an auxiliary runner member having a sliding element for engaging said lips to lock said auxiliary member to either face of the body.

5. A convertible child's vehicle comprising a platform constituting a main body and having overhanging lips facing inwardly at both ends on both faces, an auxiliary runner member having a sliding element for engaging said lips to lock said auxiliary member to either face of said body, and means for locking said sliding element in operative position.

6. A convertible child's vehicle comprising a main body member, an auxiliary member having rotatable surface-engaging elements, said auxiliary member being pivoted to swing on said body member to position the surface-engaging elements either transversely or longitudinally of the body member and means for locking said auxiliary member in either position.

7. A convertible child's vehicle comprising a platform constituting a main body having inwardly facing housings at both ends, an auxiliary member having surface engaging elements and a movable element for engaging one of said housings to lock said auxiliary member to said main body, and means for locking the movable member in engaged position.

8. A convertible child's vehicle comprising a platform forming a main body and having inwardly facing housings at both ends on both faces, an auxiliary member having surface-engaging elements and a fixed element at one end for entering one of said main body housings and a movable element at the other end to enter another of said main body housings, and means for locking the movable member in engaged position.

9. A convertible vehicle comprising a body member, an auxiliary member on the bottom of the body member, a second auxiliary member on the top of the body member, and ground engaging elements on each auxiliary member whereby the vehicle may be used with either side up.

10. A convertible vehicle comprising a body member, a detachable auxiliary member on the bottom of the body member, a second detachable auxiliary member on the top of the body member, and ground engaging elements on each auxiliary member whereby the vehicle may be used with one of the auxiliary elements removed from the body member.

11. A convertible vehicle comprising a body member having undercut ledges at each end of the top of the body member and undercut ledges at each end of the bottom of the body member, a plurality of auxiliary members so constructed that both ends of each auxiliary member may be slid simultaneously between the body member and the overhanging ledges at the opposite ends of a side of the body member to hold the body member and the auxiliary members in assembled relation, means for locking the members in assembled position, and ground engaging elements on each auxiliary member, whereby the auxiliary members may be interchangeably assembled on the two sides of the body member as desired.

SHEARMAN BOTTEESE.